(12) United States Patent
Lamoreaux (10) Patent No.: US 10,760,919 B2
(45) Date of Patent: Sep. 1, 2020

(54) EVALUATING LINE-OF-SIGHT MEASUREMENTS

(71) Applicant: Utah State University, Logan, UT (US)

(72) Inventor: Ryan Lamoreaux, Sahuarita, AZ (US)

(73) Assignee: Utah State University Research Foundation, Logan, UT (US)

( * ) Notice: Subject to any disclaimer, the term of this patent is extended or adjusted under 35 U.S.C. 154(b) by 0 days.

(21) Appl. No.: 16/683,045

(22) Filed: Nov. 13, 2019

(65) Prior Publication Data

US 2020/0149911 A1    May 14, 2020

Related U.S. Application Data

(60) Provisional application No. 62/767,247, filed on Nov. 14, 2018.

(51) Int. Cl.
| | | |
|---|---|---|
| *G01C 21/36* | (2006.01) | |
| *G06K 9/00* | (2006.01) | |
| *G01C 21/02* | (2006.01) | |
| *G06K 7/10* | (2006.01) | |
| *G11B 7/08* | (2006.01) | |
| *G01C 21/28* | (2006.01) | |
| *G06K 9/20* | (2006.01) | |

(52) U.S. Cl.
CPC ....... *G01C 21/3602* (2013.01); *G01C 21/025* (2013.01); *G01C 21/28* (2013.01); *G01C 21/3647* (2013.01); *G06K 7/10871* (2013.01); *G06K 9/00624* (2013.01); *G06K 9/20* (2013.01); *G11B 7/08* (2013.01)

(58) Field of Classification Search
CPC ............ G01C 21/3602; G01C 21/3647; G01C 21/28; G01C 21/025; G06K 9/00624; G06K 7/10871; G06K 9/20; G11B 7/08
USPC ..... 348/116; 701/523, 468, 500; 342/357.28
See application file for complete search history.

(56) References Cited

U.S. PATENT DOCUMENTS

| | | | | |
|---|---|---|---|---|
| 8,946,606 | B1* | 2/2015 | Dennison | G01C 21/20 244/3.1 |
| 2006/0085130 | A1* | 4/2006 | Belenkii | G01C 21/025 701/468 |
| 2009/0177398 | A1* | 7/2009 | Belenkii | G01C 21/165 701/500 |
| 2012/0127030 | A1* | 5/2012 | Arthur | G01S 19/45 342/357.28 |
| 2016/0214715 | A1* | 7/2016 | Meffert | B64C 39/024 |
| 2017/0323129 | A1* | 11/2017 | Davidson | G11B 7/08 |
| 2018/0136813 | A1* | 5/2018 | Abernathy | G05D 1/0038 |
| 2018/0188384 | A1* | 7/2018 | Ramanandan | G01S 19/45 |
| 2019/0154439 | A1* | 5/2019 | Binder | G01S 15/08 |

* cited by examiner

*Primary Examiner* — Paulos M Natnael
*Assistant Examiner* — Sean N. Haiem (57) ABSTRACT

For evaluating navigation information based on line-of-sight measurements, a method measures a line-of-sight measurement with an imager. The method further calculates an information metric based on the line-of-sight measurement. The information metric is a function of imager pixel measurement noise and a relative position vector for an imager frame aligned with a focal plane frame for the imager. The method evaluates navigation information using the information metric.

17 Claims, 12 Drawing Sheets

EVALUATING LINE-OF-SIGHT MEASUREMENTS

CROSS-REFERENCE TO RELATED APPLICATIONS

This application claims priority to U.S. Provisional Patent Application No. 62/767,247 entitled "EVALUATING LINE-OF-SIGHT MEASUREMENTS" and filed on Nov. 14, 2018 for Ryan Lamoreaux, which is incorporated here by reference.

FIELD

The subject matter disclosed herein relates to evaluating line-of-sight measurements.

BACKGROUND

Line-of-Sight measurements to known landmarks may be needed to improve navigation information in GPS-denied environments.

BRIEF SUMMARY

A method for evaluating line-of-sight measurements is disclosed. The method measures a line-of-sight measurement with an imager. The method further calculates an information metric based on the line-of-sight measurement. The information metric as a function of imager pixel measurement noise and a relative position vector for an imager frame aligned with a focal plane frame for the imager. The method evaluates navigation information using the information metric. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Lamoreaux, Ryan D. "Impacts of Distributions and Trajectories on Navigation Uncertainty Using Line-of-Sight Measurements to Known Landmarks in GPS-Denied Environments" is incorporated herein by reference.

The description of elements in each figure may refer to elements of proceeding figures. Like numbers refer to like elements in all figures, including alternate embodiments of like elements.

Figure 1A:
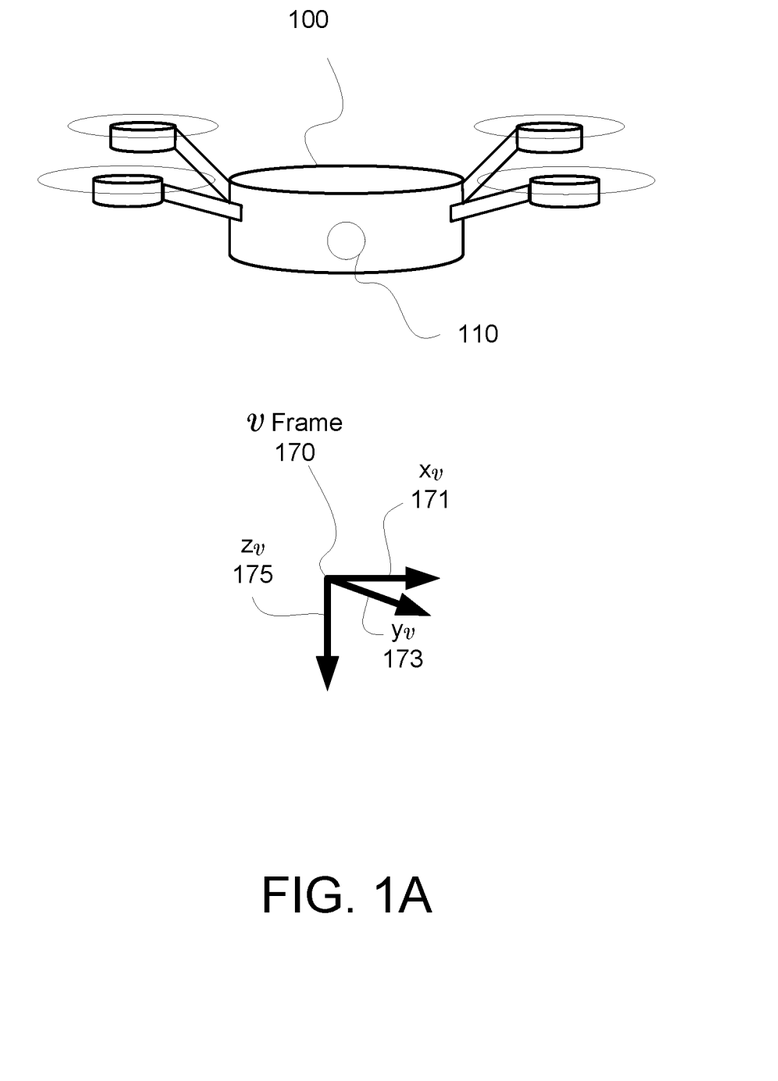
FIG. 1A is a perspective drawing of one embodiment of a vehicle and vehicle frame.

FIG. 1A is a perspective drawing of one embodiment of a vehicle 100 and vehicle frame 170. The vehicle 100 may be an autonomous vehicle 100 and/or a piloted vehicle 100. The vehicle 100 includes one or more imagers 110. In the depicted embodiment, the vehicle 100 is a flying drone. The vehicle 100 may also be an aircraft, a land vehicle, and/or a water vehicle. The vehicle 100 has a vehicle frame $\mathcal{V}$ 170. As used herein, frame refers to a coordinate frame of reference. The vehicle frame 170 includes $x_\mathcal{V}$ 171, $y_\mathcal{V}$ 173 and $z_\mathcal{V}$ 175 coordinates. As used herein, relative north is along a positive x-axis, relative east is along a positive y-axis, and relative down is along a positive z-axis.

The vehicle 100 may operate in an environment where Global Positioning System (GPS) information is unavailable. As a result, the vehicle 100 may navigate using inertial navigation to generate navigation information. Line-of-sight measurements to known landmarks may be needed to improve the navigation information in GPS-denied environments as the vehicle 100 navigates the environment. The embodiments evaluate navigation information based on line-of-sight measurements. The navigation information may be from inertial navigation and/or from the line-of-sight measurement. In one embodiment, the embodiments calculate an information metric based on the line-of-sight measurement. The information metric may be used to evaluate the navigation information. In addition, the vehicle 100 may enhance the navigation information based on the information metric. As a result, the vehicle 100 may more efficiently use the navigation information and navigate in the environment.

Figure 1B:
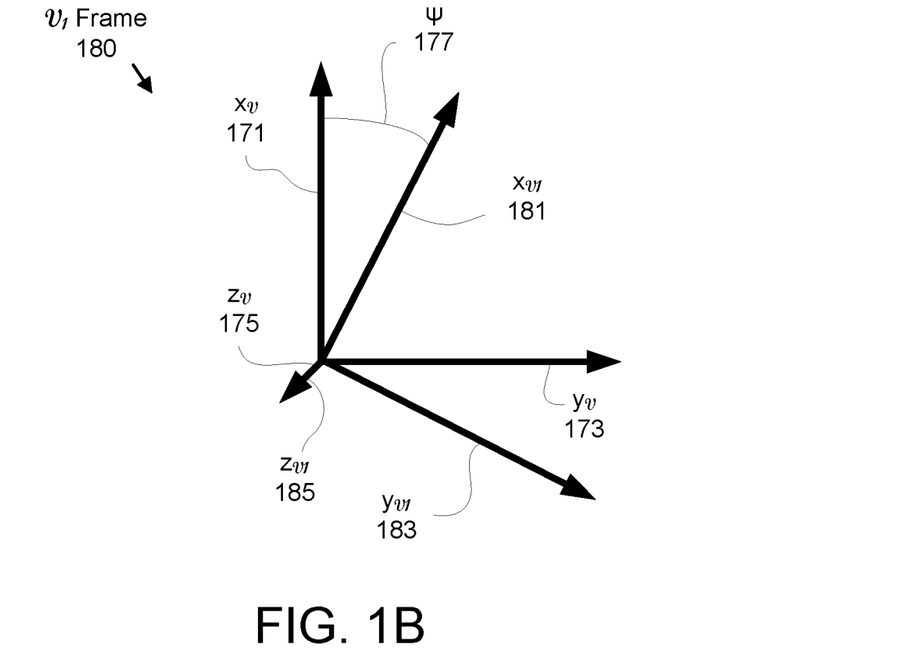
FIG. 1B is a perspective drawing of one embodiment of a vehicle 1 frame.

FIG. 1B is a perspective drawing of one embodiment of a vehicle 1 frame $\mathcal{V}1$ 180. The vehicle 1 frame 180 is the vehicle frame 170 rotated by angle $\Psi$ 177 about the $z_\mathcal{V}$ 175 coordinate axis. The vehicle 1 frame 180 includes $x_{\mathcal{V}1}$ 181, $y_{\mathcal{V}1}$ 183 and $z_{\mathcal{V}1}$ 185 coordinates.

Figure 1C:
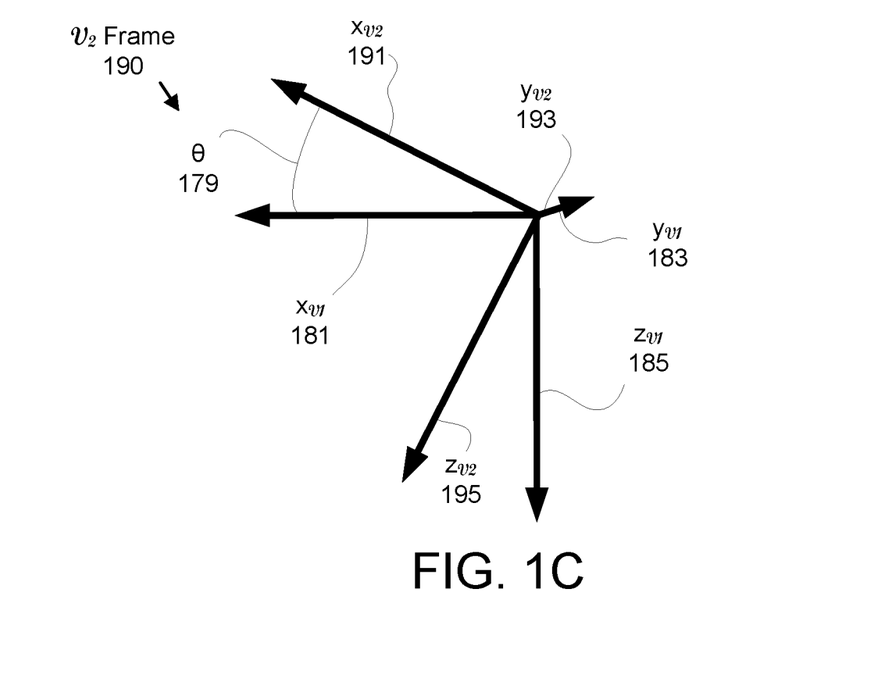
FIG. 1C is a perspective drawing of one embodiment of a vehicle 2 frame.

FIG. 1C is a perspective drawing of one embodiment of a vehicle 2 frame $\mathcal{V}2$ 190. The vehicle 2 frame 190 is the vehicle 1 frame 180 rotated by angle $\theta$ 179 about the $y_{\mathcal{V}1}$ 183 coordinate axis. The vehicle 2 frame 190 includes $x_{\mathcal{V}2}$ 191, $y_{\mathcal{V}2}$ 193 and $z_{\mathcal{V}2}$ 195 coordinates.

Figure 1D:
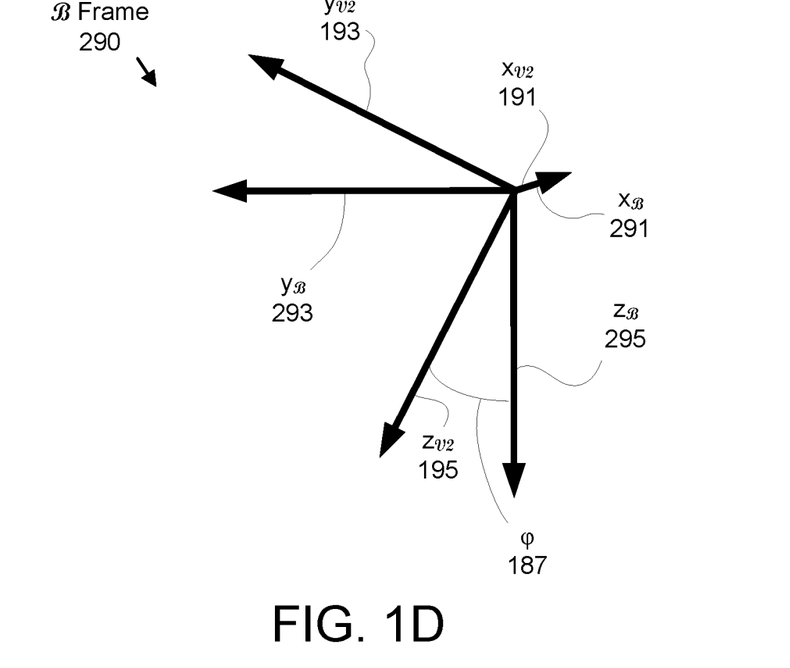
FIG. 1D is a perspective drawing of one embodiment of a body frame.

FIG. 1D is a perspective drawing of one embodiment of a body frame B 290. The body frame 290 is the vehicle 2 frame 190 rotated by angle $\varphi$ 187 about the $x_{\mathcal{V}2}$ 191 coordinate axis. The body frame 290 includes $x_\mathcal{B}$ 291, $y_\mathcal{B}$ 293 and $z_\mathcal{B}$ 295 coordinates.

Figure 1E:
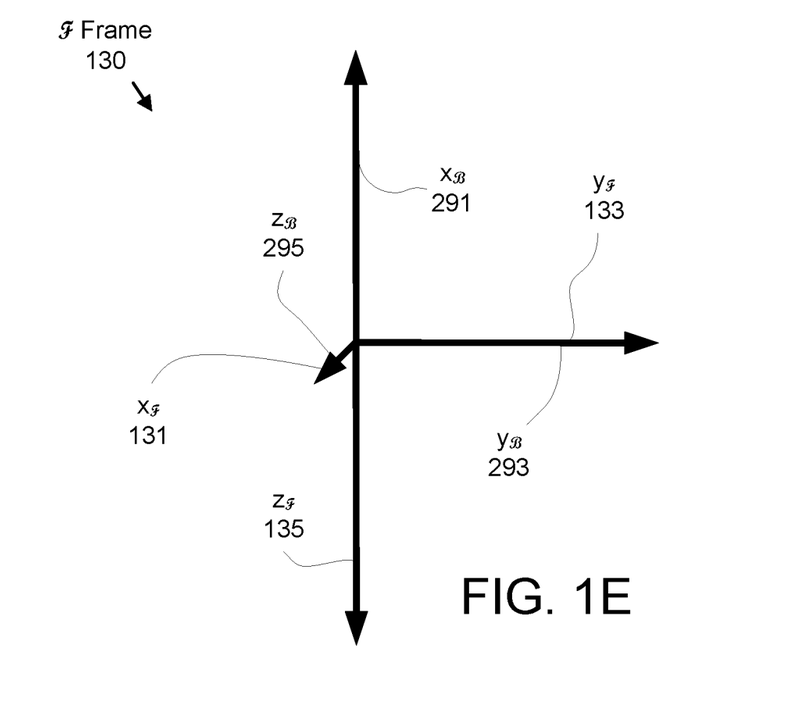
FIG. 1E is a perspective drawing of one embodiment of an imager frame.

FIG. 1E is a perspective drawing of one embodiment of an imager frame $\mathcal{F}$ 130. The imager frame 130 is the body frame 290 rotated by 90 degrees about the $y_\mathcal{B}$ 293 coordinate axis. The imager frame 130 includes $x_\mathcal{F}$ 131, $y_\mathcal{F}$ 133 and $z_\mathcal{F}$ 135 coordinates.

Figure 1F:
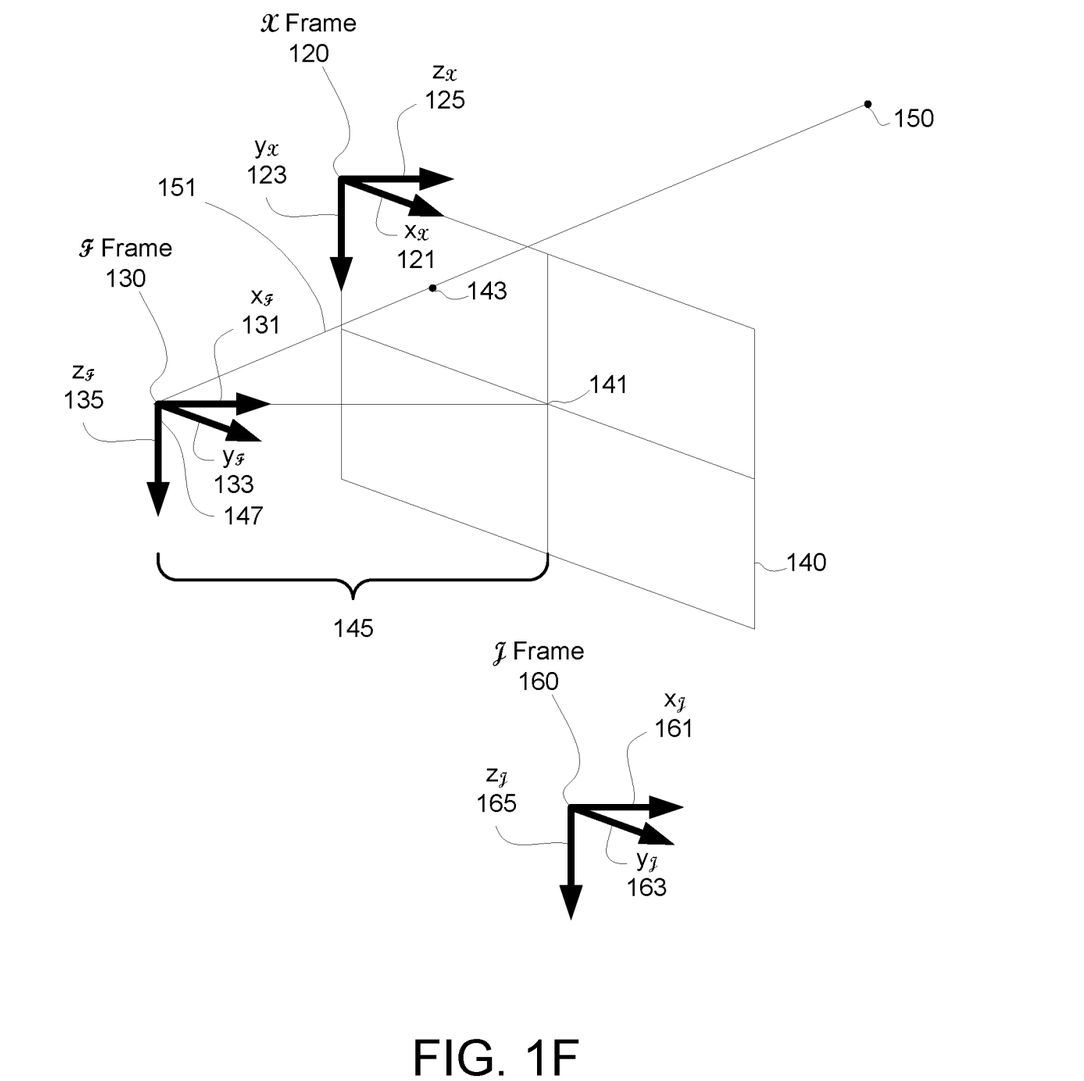
FIG. 1F is a perspective drawing of one embodiment of a focal plane and focal plane frame.

FIG. 1F is a perspective drawing of one embodiment of a focal plane 140 and focal plane frame $\mathcal{X}$ 120 for the imager 110. In the depicted embodiment, the imager frame 130 is located at a focal point 147 for the imager 110. The focal plane 140 includes an origin 141 a focal length 145 from the focal point 147 along the $x_\mathcal{F}$ 131 coordinate axis. The focal plane frame $\mathcal{X}$ 120 includes a $z_\mathcal{X}$ 125 coordinate that is parallel to $x_\mathcal{F}$ 131. In one embodiment, $z_\mathcal{X}$ 125 is colinear with $x_\mathcal{F}$ 131. The imager plane 140 is aligned with the focal plane frame $\mathcal{X}$ 120 for the imager 110. The imager 110 images a landmark 150 at an imager pixel 143 in the imager plane 140. A relative position vector $\hat{r}$ 151 connects the focal point 147 to the landmark 150 via the imager pixel 143.

Equation 1 shows the calculation of angular relationships $c_{11..33}$ as functions of angle $\Psi$ 177, angle $\theta$ 179, and angle $\varphi$ 187.

$$\begin{bmatrix} c_{11} & c_{12} & c_{13} \\ c_{21} & c_{22} & c_{23} \\ c_{31} & c_{32} & c_{33} \end{bmatrix} = \begin{bmatrix} \cos\theta\cos\psi & \cos\theta\sin\psi & -\sin\theta \\ \sin\phi\sin\theta\cos\psi - & \sin\phi\sin\theta\sin\psi - & \sin\phi\cos\theta \\ \cos\phi\sin\psi & \cos\phi\cos\psi & \\ \cos\phi\sin\theta\cos\psi + & \cos\phi\sin\theta\sin\psi - & \cos\phi\cos\theta \\ \sin\phi\sin\psi & \sin\phi\cos\phi & \end{bmatrix} \quad \text{Equation 1}$$

Figure 1G:
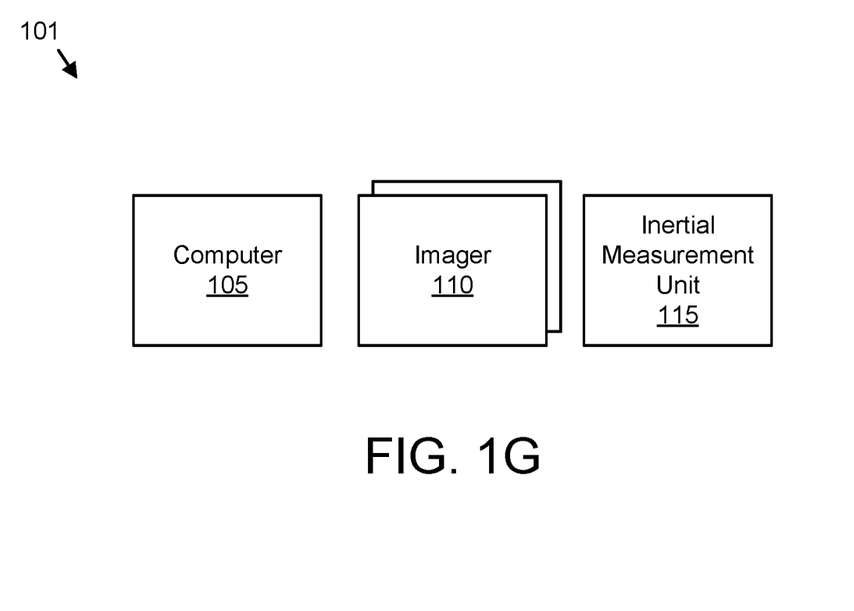
FIG. 1G is a schematic block diagram of one embodiment of a navigation device.

FIG. 1G is a schematic block diagram of one embodiment of a navigation device 101. The navigation device 101 may be disposed in the vehicle 100. In the depicted embodiment, the navigation device 101 includes a computer 105, the one or more imagers 110, and an inertial measurement unit 115. The inertial measurement unit 115 may include one or more accelerometers and/or gyroscopes. The inertial measurement unit 115 may estimate the navigation information and/or a position estimation as a position and/or orientation of the vehicle 100.

Figure 1H:
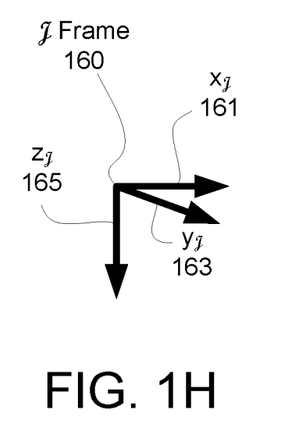
FIG. 1H is a perspective drawing of one embodiment of an inertial frame.

FIG. 1H is a perspective drawing of one embodiment of an inertial frame $\mathcal{I}$ 160. The inertial frame $\mathcal{I}$ 160 is the frame of the inertial measurement unit 115. The inertial frame $\mathcal{I}$ 160 includes $x_\mathcal{I}$ 161, $y_\mathcal{I}$ 163 and $z_\mathcal{I}$ 165 coordinates.

Figure 2A:
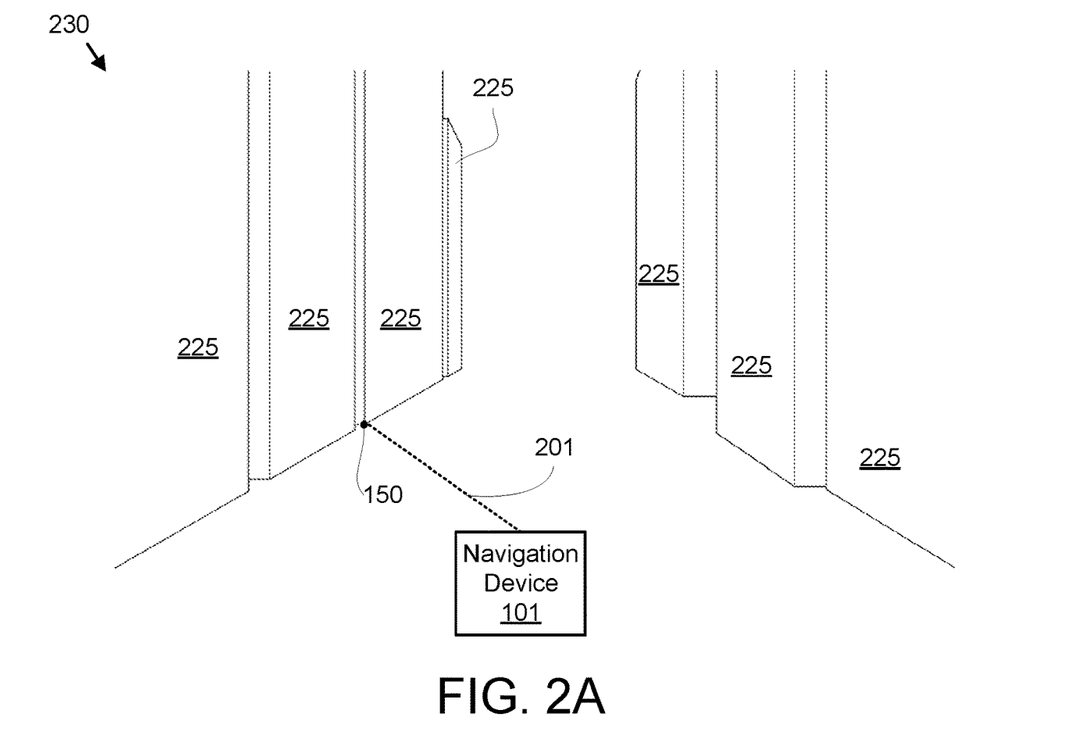
FIG. 2A is a perspective drawing of one embodiment of a navigation environment.

FIG. 2A is a perspective drawing of one embodiment of a navigation environment 230. In the depicted embodiment, the navigation device 101 is within buildings 225 of the city. The navigation device 101 may be disposed on the vehicle 101, although for simplicity the vehicle 101 is not shown. The buildings 225 may block GPS signals, creating a GPS-denied environment. In the depicted embodiment, the navigation device 101 makes a line-of-sight measurement 201 to a landmark 150 on a building 225. The embodiments evaluate the line-of-sight measurement 201 using the information metric to improve navigation within the environment 230. For example, the line-of-sight measurement 201 may be used to generate navigation information or correct a position estimate. The information metric may evaluate the navigation information and determine how best to update the position estimate using the navigation information.

Figure 2B:
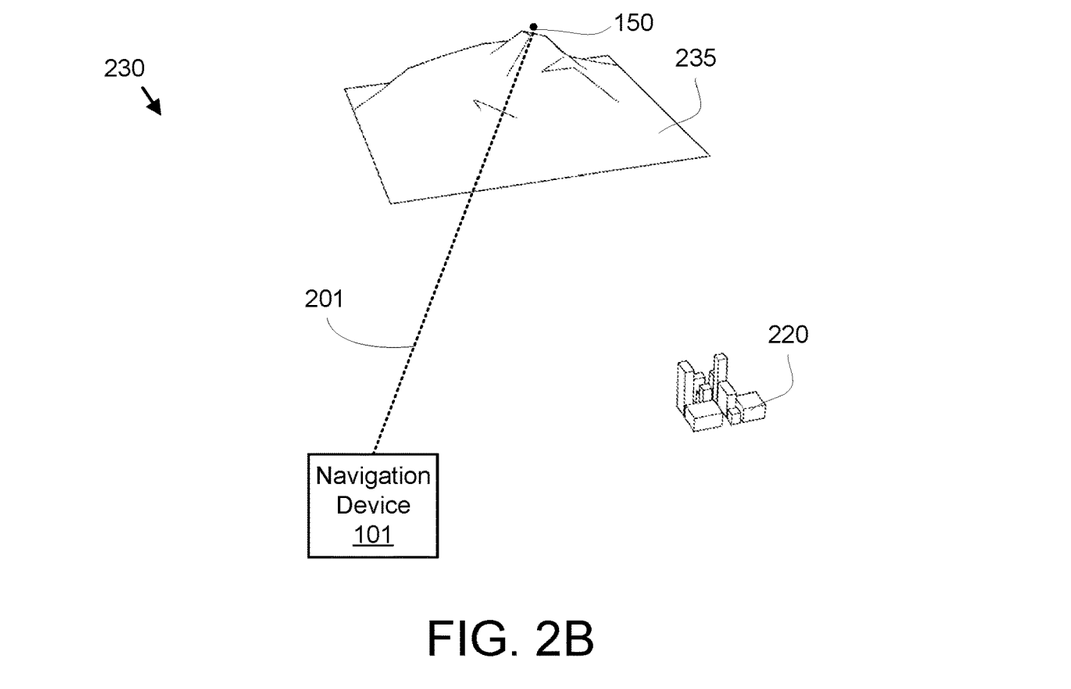
FIG. 2B is a perspective drawing of one alternate embodiment of a navigation environment.

FIG. 2B is a perspective drawing of one alternate embodiment of the navigation environment 230. In the depicted embodiment, the navigation device 101 is flying on the vehicle 110, not shown, toward a destination within the city 220. The navigation device 101 makes another line-of-sight measurement 201 to a landmark 150 in order to improve navigation information. The landmark 150 may be a peak of a mountain 235. Navigation information may be generated from the line-of-sight measurement 201. The embodiments evaluate the line-of-sight measurement 201 using the information metric to improve navigation within the environment 230. The information metric may evaluate the navigation information and determine how best to update the position estimate using the navigation information.

Figure 3:
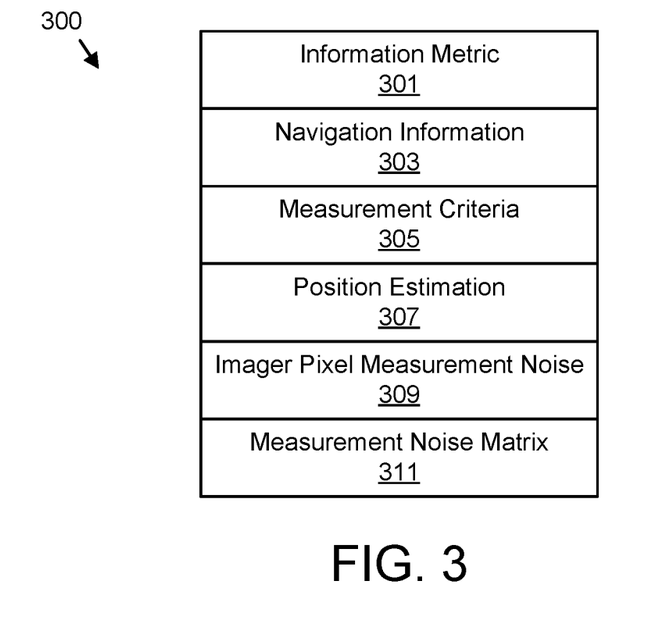
FIG. 3 is a schematic block diagram of one embodiment of navigation data.

FIG. 3 is a schematic block diagram of one embodiment of navigation data 300. The navigation data 300 may be organized as a data structure in a memory. In the depicted embodiment, the navigation data 300 includes the information metric 301, the navigation information 303, the measurement criteria 305, the position estimation 307, imager pixel measurement noise 309, and a measurement noise matrix 311.

The navigation information 303 may express the position and/or orientation of the vehicle 100 based on the line-of-sight measurement 201 and/or the position estimation 307. The navigation information 303 may comprise a position matrix in the vehicle frame $\mathcal{V}$ 170 and/or inertial frame $\mathcal{I}$ 160. The information metric 301 may be used to evaluate the navigation information 303 as will be described hereafter.

The measurement criteria 305 may be used to evaluate the information metric 301. The position estimation 307 may be a position and/or orientation of the vehicle 100 as determined by the inertial measurement unit 115. The position estimation 307 may comprise a position matrix in the vehicle frame $\mathcal{V}$ 170 and/or inertial frame $\mathcal{I}$ 160.

The imager pixel measurement noise $\sigma_{\delta\lambda}$ 309 may specify average pixel measurement noise for the imager 110. In one embodiment, the measurement noise is assumed to be the same along each coordinate axis 121/123/125. The measurement noise matrix R 311 may express the imager pixel measurement noise 309 in the focal plane frame 120.

Figure 4:
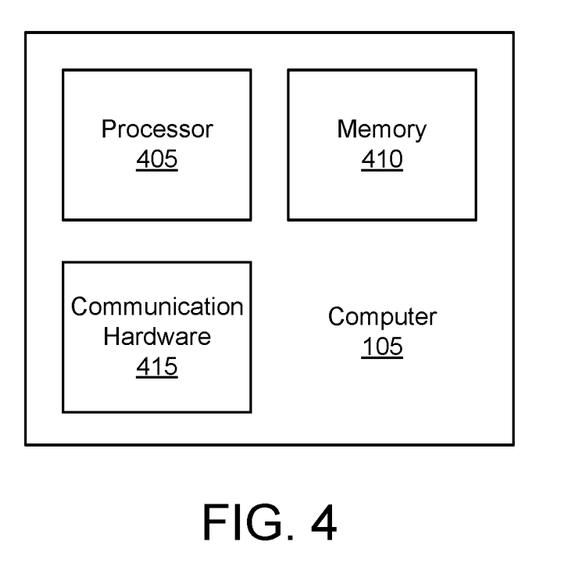
FIG. 4 is a schematic block diagram of one embodiment of a computer.

FIG. 4 is a schematic block diagram of one embodiment of the computer 105. In the depicted embodiment, the computer 105 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices.

Figure 5:
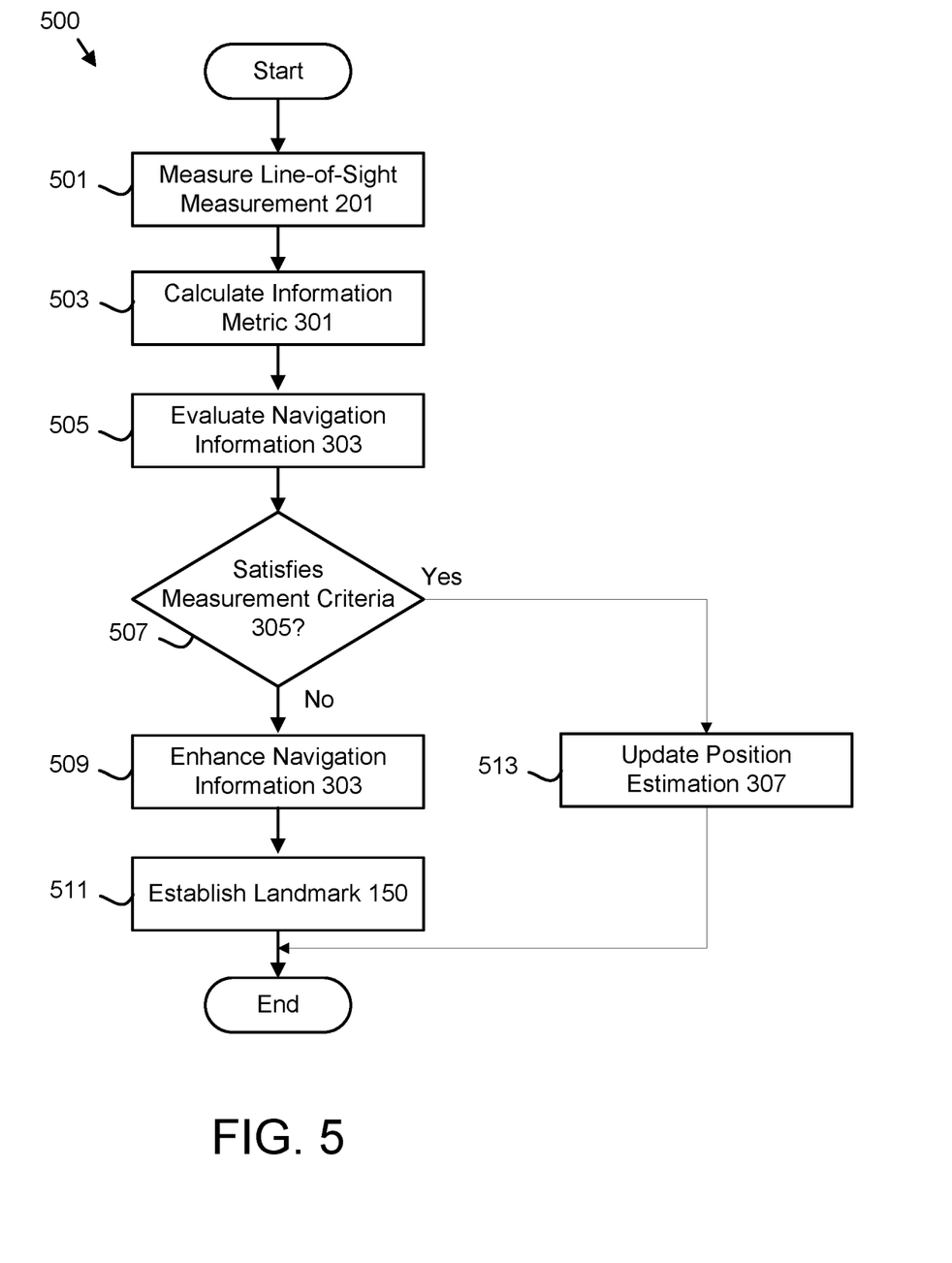
FIG. 5 is a schematic flow chart diagram of one embodiment of a line-of-sight measurement evaluation method.

FIG. 5 is a schematic flow chart diagram of one embodiment of a line-of-sight measurement evaluation method 500. The method 500 evaluates the navigation information 303 using the information metric 301. The method 500 may be performed by the navigation device 101, the computer 105, and/or the processor 405.

The method 500 starts, and in one embodiment, the imager 110 measures 501 the line-of-sight measurement 201 to the landmark 150. The line-of-sight measurement 201 may be in the imager frame $\mathcal{F}$ 130. The line-of-sight measurement 201 may generate the imager pixel 143 representing the landmark 150.

The processor 405 may calculate 503 the information metric 301 based on the line-of-sight measurement 201. The information metric 301 may be a function of the imager pixel measurement noise 309 and the relative position vector 151.

In one embodiment, the information metric 301 is calculated 503 using Equation 2, wherein $\sigma_{\delta\lambda}$ is the imager pixel measurement noise 309 of the imager pixel 143, $c_{11..33}$ are from Equation 1, $$\hat{r}_{\overline{\mathcal{F}},n}^{\mathcal{I}}$$

is the relative position vector 151 in the relative north direction of the observed landmark 150 with respect to the vehicle 100 expressed in the imager frame $\mathcal{F}$ 130, $$\hat{r}_{\overline{\mathcal{F}},e}^{\mathcal{I}}$$

is the relative position vector 151 in the relative east direction of the observed landmark 150 with respect to the vehicle 100 expressed in the imager frame $\mathcal{F}$ 130, $$\hat{r}_{\overline{\mathcal{F}},d}^{\mathcal{I}}$$

is the relative position vector 151 in the relative down direction of the observed landmark 150 with respect to the vehicle 100 expressed in the imager frame $\mathcal{F}$ 130, and d is a distance of the relative position vector 151.

$$IM = \frac{1}{\sigma_{\delta\lambda}^2}\left(\frac{c_{31}\hat{r}_{\overline{\mathcal{F}},n}^{\mathcal{I}} + c_{32}\hat{r}_{\overline{\mathcal{F}},e}^{\mathcal{I}} + c_{33}\hat{r}_{\overline{\mathcal{F}},d}^{\mathcal{I}} + d^2}{\left(c_{31}\hat{r}_{\overline{\mathcal{F}},n}^{\mathcal{I}} + c_{32}\hat{r}_{\overline{\mathcal{F}},e}^{\mathcal{I}} + c_{33}\hat{r}_{\overline{\mathcal{F}},d}^{\mathcal{I}}\right)^4}\right) \quad \text{Equation 2}$$

In one embodiment, the information metric 301 is expressed as a trace as shown in Equation 3, wherein the Trace is a sum of diagonal terms, $\Lambda$ is a partial derivative of the line-of-sight measurement 201 with respect to the line-of-sight measurement 201 and R is the measurement noise matrix 311.

$$IM = \text{Trace}(\Lambda^T R^{-1} \Lambda) \quad \text{Equation 3}$$

In one embodiment, if the vehicle 100 has an attitude of zero such as during flat, level flight, and is pointing relative north, the information metric IM 301 may be calculated 503 using Equation 4.

$$IM = \frac{1}{\sigma_{\delta\lambda}^2}\left(\frac{\hat{r}_{\overline{\mathcal{F}},d}^{\mathcal{I}} + d^2}{(\hat{r}_{\overline{\mathcal{F}},d}^{\mathcal{I}})^4}\right) \quad \text{Equation 4}$$

The processor 405 may evaluate 505 the navigation information 303 using the information metric 301. In one embodiment, the processor 405 compares the information metric 301 to the measurement criteria 305.

The processor 405 further determines 507 whether the information metric 301 satisfies the measurement criteria 305. If the measurement criteria 305 is satisfied, the processor 405 may update 513 the position estimation 307 with the navigation information 303 from the line-of-sight measurement 201 and the method 500 ends. The line-of-sight measurement 201 and/or navigation information 303 may be applied to the position estimation 307 using an extended Kalman filter. In one embodiment, the information estimate 307 is corrected to conform with the line-of-sight measurement 201.

If the measurement criteria 305 is not satisfied, the processor 405 may enhance 509 the navigation information 303. In one embodiment, the processor 405 measures additional line-of-sight measurements 201 to the first landmark 150 and/or to other landmarks 150 to enhance 509 the navigation information 303.

In one embodiment, the processor 405 modifies a route of the vehicle 100 to include additional landmarks 150 to enable additional line-of-sight measurements 201 for enhancing the navigation information 303. For example, the route may be modified to pass nearer to additional landmarks 150 as will be shown hereafter in FIG. 6B.

In one embodiment, the processor 405 may direct establishing 511 a new landmark 150 in response to the information metric 301 not satisfying a not measurement criteria 305 and the method 500 ends. The new landmark 150 may be established at a location such that the line-of-sight measurement 201 of the new landmark 150 generates an enhanced information metric 301 that satisfies the measurement criteria 305. For example, the processor 405 may calculate where to establish 511 the new landmark 150 so that the line-of-sight measurement 201 to the new landmark 500 results in an information metric 301 that satisfies the measurement criteria 305.

Figure 6A:
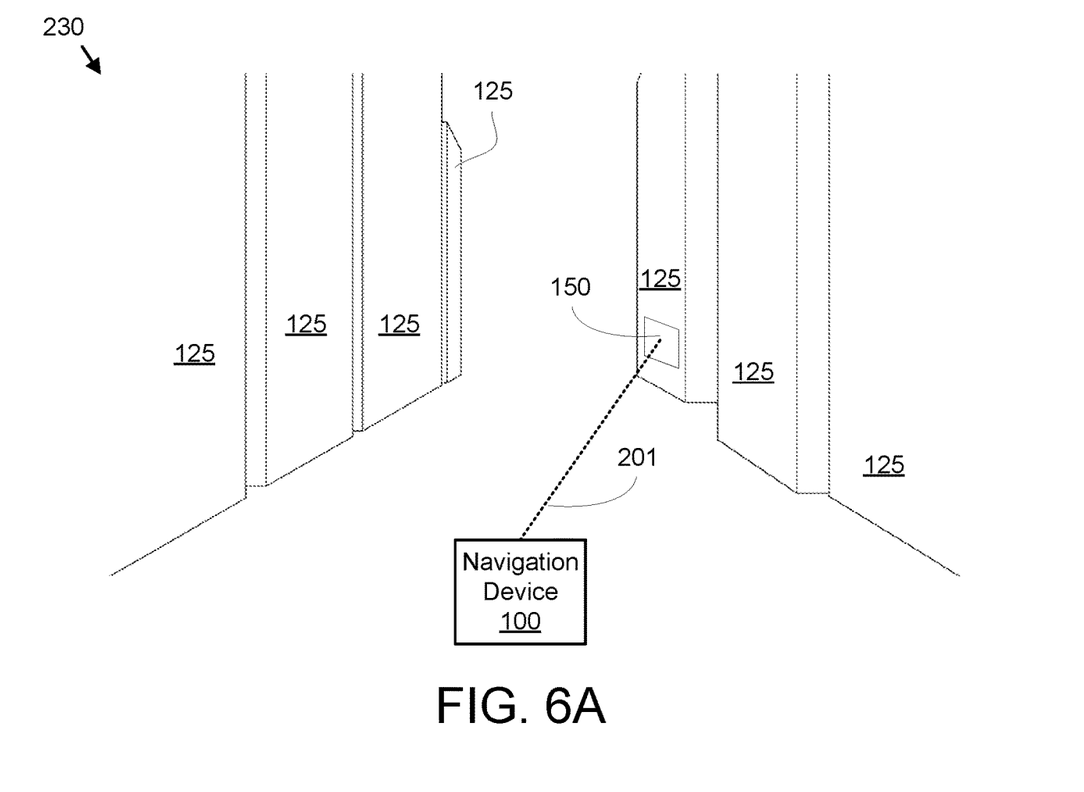
FIG. 6A is a perspective drawing illustrating one embodiment of establishing a landmark.

FIG. 6A is a perspective drawing illustrating one embodiment of establishing a new landmark 150. In the depicted embodiment, the navigation device 101 measures one or more line-of-sight measurements 201 to at least one landmark 150 in an environment 230. The processor 405 may further calculate the information metric 301 for each line-of-sight measurement 201. If the new landmark 150 satisfies the measurement criteria 305, the processor 405 may record and/or publish the new landmark 150. The new landmark 150 may subsequently be used for navigation, resulting in improved position estimations 307 from line-of-sight measurements 201 to the new landmark 150.

Figure 6B:
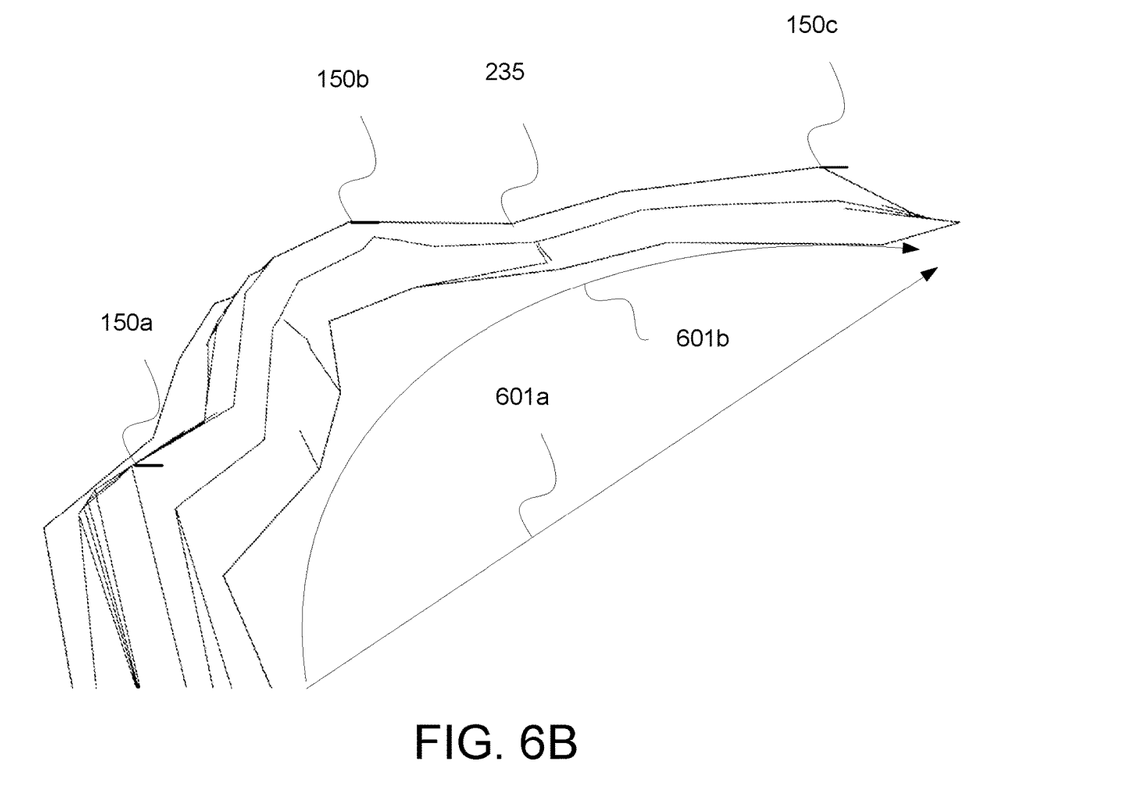
FIG. 6B is a perspective drawing illustrating one embodiment of modifying a route.

FIG. 6B is a perspective drawing illustrating one embodiment of modifying a route 601. In the depicted embodiment, a first route 601a is shown for the vehicle 100. If an information metric 301 calculated for a first landmark 150a does not satisfy the measurement criteria 305, the first route 601a may be modified to a second route 601b that passes nearer to additional landmarks 150b/c that may be used to generate additional navigation information 303. As a result, the position estimation 307 for the vehicle 100 may be improved.

The embodiments calculate the information metric 301 based on the line-of-sight measurement 201 and evaluate navigation information 303 using the information metrics 301. As a result, a navigation device 101 may confidently update the position estimation 307 with the line-of-sight measurement 201 if the information metric 301 satisfies the measurement criteria 305. However, if the information metric 301 does not satisfy the measurement criteria 305, the navigation device 101 may enhance the navigation information 303, establish a new landmark 150, and/or modify a route 601 two include additional landmarks 150. Thus, the efficiency and efficacy of the navigation device 101 and the computer 105 therein is enhanced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
measuring, by use of a processor, a line-of-sight measurement with an imager;
calculating an information metric based on the line-of-sight measurement, wherein the information metric is a function of imager pixel measurement noise and a relative position vector for an imager frame aligned with a focal plane frame for the imager, the function calculated as $$IM = \frac{1}{\sigma_{\delta\lambda}^2} \left( \frac{\hat{r}_{\mathcal{F},d}^{\mathcal{T}} + d^2}{(\hat{r}_{\mathcal{F},d}^{\mathcal{T}})^4} \right),$$

wherein $\sigma_{\delta\lambda}$ is imager pixel measurement noise, $$\hat{r}_{\mathcal{F},d}^{\mathcal{T}}$$

is relative position vector in the down direction of an observed landmark with respect to a vehicle expressed in the imager frame, and d is a distance of the relative position vector; and
evaluating navigation information using the information metric.

2. The method of claim 1, the method further comprising enhancing the navigation information in response to the information metric not satisfying measurement criteria.

3. The method of claim 2, wherein a route is modified to include additional landmarks for line-of-sight measurements to enhance the navigation information.

4. The method of claim 1, the method further comprising establishing a new landmark in response to the information metric not satisfying measurement criteria, wherein a line-of-sight measurement of the new landmark generates an enhanced information metric that satisfies the measurement criteria.

5. The method of claim 1, the method further updating a position estimation with the line-of-sight measurement in response to the information metric satisfying measurement criteria.

6. The method of claim 1, wherein the imager is disposed on an autonomous vehicle.

7. An apparatus comprising:
a processor;
a memory storing code executable by the processor to:
measure a line-of-sight measurement with an imager;
calculate an information metric based on the line-of-sight measurement, wherein the information metric is a function of imager pixel measurement noise and a relative position vector for an imager frame aligned with a focal plane frame for the imager, the function calculated as $$IM = \frac{1}{\sigma_{\delta\lambda}^2} \left( \frac{\hat{r}_{\mathcal{F},d}^{\mathcal{T}} + d^2}{(\hat{r}_{\mathcal{F},d}^{\mathcal{T}})^4} \right),$$

wherein $\sigma_{\delta\lambda}$ is imager pixel measurement noise, $$\hat{r}_{\mathcal{F},d}^{\mathcal{T}}$$

is relative position vector in the down direction of an observed landmark with respect to a vehicle expressed in the imager frame, and d is a distance of the relative position vector; and evaluate navigation information using the information metric.

8. The apparatus of claim 7, the processor further enhancing the navigation information in response to the information metric not satisfying measurement criteria.

9. The apparatus of claim 8, wherein a route is modified to include additional landmarks for line-of-sight measurements to enhance the navigation information.

10. The apparatus of claim 7, the processor further establishing a new landmark in response to the information metric not satisfying measurement criteria, wherein a line-of-sight measurement of the new landmark generates an enhanced information metric that satisfies the measurement criteria.

11. The apparatus of claim 7, the processor further updating a position estimation with the line-of-sight measurement in response to the information metric satisfying measurement criteria.

12. The method of claim 1, wherein one or more imagers are disposed on an autonomous vehicle.

13. A program product comprising a non-transitory computer-readable storage medium storing code executable by a processor to:

measure a line-of-sight measurement with an imager;

calculate an information metric based on the line-of-sight measurement, wherein the information metric is a function of imager pixel measurement noise and a relative position vector for an imager frame aligned with a focal plane frame for the imager, the function calculated as $$IM = \frac{1}{\sigma_{\delta\lambda}^2}\left(\frac{\hat{r}^{\mathcal{I}}_{T\atop\mathcal{F},d} + d^2}{(\hat{r}^{\mathcal{I}}_{T\atop\mathcal{F},d})^4}\right),$$

wherein $\sigma_{\delta\lambda}$ is imager pixel measurement noise, $$\hat{r}^{\mathcal{I}}_{T\atop\mathcal{F},d}$$

is relative position vector in the down direction of an observed landmark with respect to a vehicle expressed in the imager frame, and d is a distance of the relative position vector; and evaluate navigation information using the information metric.

14. The program product of claim 13, the processor further enhancing the navigation information in response to the information metric not satisfying measurement criteria.

15. The program product of claim 14, wherein a route is modified to include additional landmarks for line-of-sight measurements to enhance the navigation information.

16. The program product of claim 13, the processor further establishing a new landmark in response to the information metric not satisfying measurement criteria, wherein a line-of-sight measurement of the new landmark generates an enhanced information metric that satisfies the measurement criteria.

17. The program product of claim 13, the processor further updating a position estimation with the line-of-sight measurement in response to the information metric satisfying measurement criteria.

\* \* \* \* \*